F. P. CANFIELD.
Driving Gears for Elevators.
No. 149,835. Patented April 21, 1874.
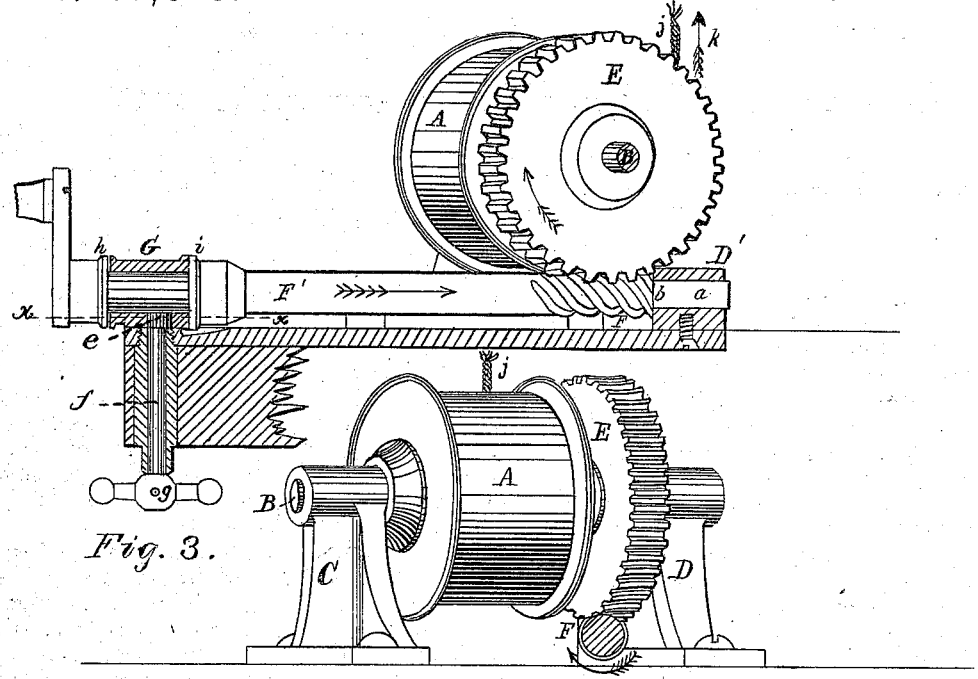
Fig. 3.
Fig. 2.
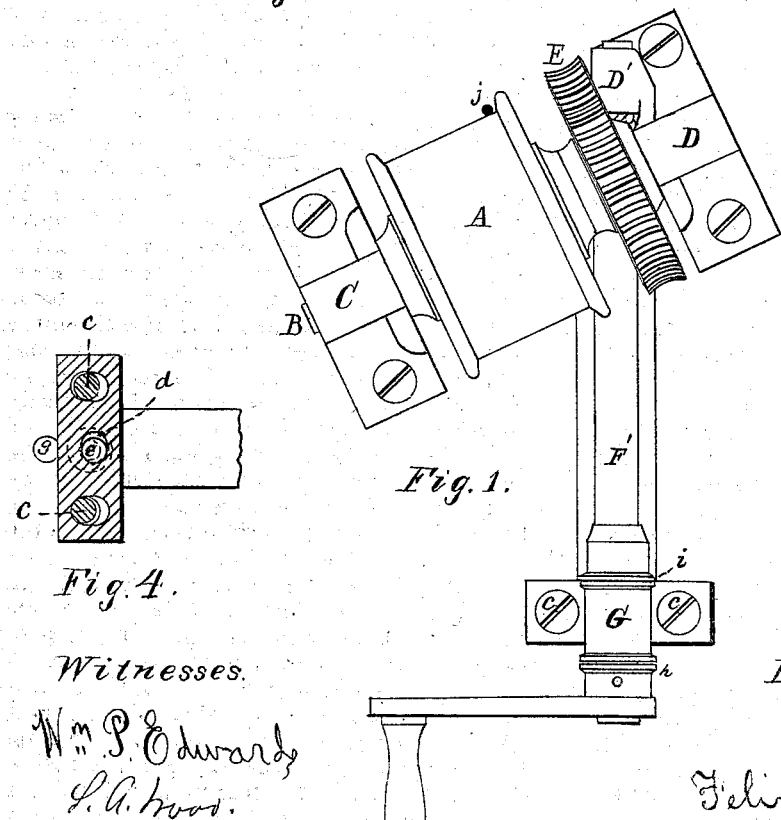
Fig. 4.
Fig. 1.
Witnesses
Wm P. Edwards
L. A. Wood
Inventor
Felix P. Canfield

UNITED STATES PATENT OFFICE.

FELIX P. CANFIELD, OF BOSTON, MASSACHUSETTS.

IMPROVEMENT IN DRIVING-GEARS FOR ELEVATORS.

Specification forming part of Letters Patent No. 149,835, dated April 21, 1874; application filed February 17, 1874.

*To all whom it may concern:*

Be it known that I, FELIX P. CANFIELD, of Boston, in the county of Suffolk and State of Massachusetts, have invented certain new and useful Improvements in Driving-Gear for Elevators, of which the following, taken in connection with the accompanying drawings, is a specification.

My invention relates to a peculiar application of a worm-wheel and a tangent-screw for imparting motion to the winding-drum of an elevator or hoisting apparatus, and to the means employed for controlling the same; and it consists, first, in the use, in combination with the winding-drum of an elevator, of a worm-gear having teeth upon its periphery, so arranged that a plane cutting through the center of a tooth, from end to end, shall be parallel to and radial from the axis of said wheel, and a worm or tangent screw for imparting motion to said wheel, the axis of which is placed at such an angle to the plane of revolution of said wheel that the threads of said screw at the point of contact therewith shall be parallel to the teeth of said wheel and its axis of revolution. My invention further consists in the combination of a worm-wheel having teeth thereon, the centers of which are in planes parallel to and radial from its axis, and a tangent-screw arranged with its axis at an angle to the plane of revolution of said wheel, and provided with two or more separate threads, as will be described. My invention further consists in providing the worm-shaft with shoulders at either end, to take the thrust of said shaft, one of said thrust shoulders being smaller in diameter, and the other larger in diameter, than the thread of the screw, and mounting said shaft in bearings, one of which is adjustable, so that the thrust may be transferred from the small to the large shoulder, or vice versa, at the will of the operator. It further consists in the use, in combination with a worm-shaft mounted in bearings, one of which is movable, of an eccentric arranged to rotate in a slot provided for the purpose in said movable box, for the purpose of moving it in the direction of the length of said shaft, as will be hereinafter described.

In the drawings, Figure 1 is a plan of my improvement as applied to a hoisting-drum. Fig. 2 is an oblique elevation of the drum and worm-wheel with the screw-shaft in section; and Fig. 3 is another oblique elevation, seen at right angles to Fig. 2, with one of the bearings of the drum-shaft cut away, and showing the two bearings of the worm-shaft in section. Fig. 4 is a horizontal section through the lower part of the movable bearing on line *x x*, and showing the eccentric for adjusting the box in plan.

A is a hoisting-drum, firmly secured to the shaft B, which is mounted in bearings in the stands C and D in any well-known manner. E is a toothed wheel, firmly secured to the shaft B, and having its periphery curved or hollowed out to conform to the surface of the screw for operating it, and having its teeth arranged parallel to its axis, or so that a plane cutting through the center of a tooth from end to end shall be parallel to and radial from said axis.

It does not, however, follow of necessity that the periphery of the worm-wheel should be made concave to fit the periphery of the worm, as it is evident that a straight tooth could be used with the worm; but I prefer the curved periphery, for the reason that a greater amount of contact is thereby attained.

F is a tangent-screw provided with three separate threads, for the purpose of obtaining an increase of pitch and a consequent increase of speed, and its shaft F' is mounted in the bearings D' and G. The bearing D' is firmly secured to the floor or the frame-work of the apparatus, and carries the journal *a* of the shaft F', which is considerably smaller in diameter than the screw-thread, so that the shoulder *b*, which, at certain times, may take the thrust, shall be within the diameter of the periphery of the screw-thread. The bearing G is secured to the floor or frame-work by the bolts *c c*, which pass through slots formed therein for the purpose, as shown in Figs. 3 and 4. The under side of the stand or bearing G has formed therein a slot, *d*, in which is fitted the eccentric *e*, mounted upon the upper end of the shaft *f*, upon the lower end of which is secured the handle *g*, by which it may be rotated to move the stand G toward or away from the bearing D'. The worm-shaft F' is provided with the collars *h* and *i* upon either side of the bearing G, of considerably greater diameter than the worm, and arranged to work in connection with the ends of the stand or bearing G, which is made of equal diameter to receive the thrust of the worm-shaft, and by the friction of said surfaces at a point outside of the periphery of the screw-thread cause an increased resistance to the revolution of the worm-shaft, and prevent the running down of the load.

With a worm having a thread of as steep a pitch as that shown in the drawings, having journals and shoulders to receive the endwise thrust imparted thereto, smaller than the worm, and arranged to revolve freely in its bearings, the pressure of the teeth of the wheel upon the thread of the worm will cause the worm to revolve, and the load will run down, as may be clearly demonstrated by operating the device, when in the condition shown in the drawing, by applying power to the rope $j$ in the direction of the arrow $k$, to revolve the drum A, when it will be found that the screw F and its shaft F' will be easily revolved; but if the eccentric be turned one-half a revolution, so as to move the box G in a direction away from the hoisting-drum, it will be brought in contact with the collar $h$, and moving the worm-shaft slightly in the same direction, and carrying the shoulder $b$ away from the bearing D', it will be found that if the same power be applied to the rope $j$, the worm-shaft cannot be revolved thereby, and the load will be sustained.

As heretofore constructed, it has been impracticable to use the worm-wheel and tangent-screw for operating hoisting apparatus to be worked by hand, for the reason that if the screw is single-threaded and a flat pitch, it works too slow, and if the diameter of the wheel is reduced to increase the speed, the leverage is decreased and the power diminished. This difficulty is overcome in power-machines by speeding up the worm-shaft, but this cannot be done in hand-machines; and if the pitch of the thread is increased to increase the speed, then the power lost by applying the power to turn the winding-drum obliquely to the plane of revolution of the wheel, and the reduction of the power occasioned by the increase of friction, due to the endwise thrust upon the drum-shaft caused by the angularity of the teeth of the wheel, causes such a reduction of power as to make it impracticable to work the apparatus by hand.

By the use of my improved arrangement and construction of the worm-wheel and tangent-screw this difficulty is obviated, and a double, triple, or quadruple-threaded screw may be used with perfect ease, and without a particle of end thrust being imparted to the drum-shaft, except what is due to the friction between the threads of the screw and the teeth of the wheel, none whatever being due to the angularity of the threads of the screw, as the power exerted to revolve the worm-wheel is applied exactly in line with the plane of revolution of said wheel.

By the adoption of my improved construction and arrangement of worm-wheel, tangent-screw, adjustable-box, and large and small thrust-bearings, the thread of the worm may be as steep as an angle of forty-five degrees and still be perfectly self-sustaining, or so adjusted as to allow the load to run down at the will of the operator.

Another advantage is, that the end thrust on the screw-shaft is greatly diminished, the strain being partly transferred from the shoulders of the shaft to the sides of the journals, thereby greatly reducing the friction.

Many small hand-elevators are now in use, and are constantly being put into operation in private residences, family hotels, and boarding-houses, in which it would be very desirable to be able to control the mechanism so as to make it self-sustaining, or so that the car with its load may descend by its own weight, at the option of the operator.

What I claim as new, and desire to secure by Letters Patent of the United States, is—

1. In combination with the winding-drum of an elevator or hoisting apparatus, the wheel E, provided with teeth, the center lines of which are parallel to its axis, and the tangent-screw F, arranged at such an angle to the plane of revolution of the wheel that the thread of said screw upon the side in contact with the wheel shall be parallel to the teeth and the axis of said wheel, substantially as described.

2. The combination of a worm-wheel, having teeth arranged in planes parallel to and radial from its axis, and a tangent-screw, provided with two or more separate threads, and having its axis arranged at an angle to the plane of revolution, substantially as described.

3. In combination with a worm-wheel, a tangent-screw having its axis placed at an angle to the plane of revolution of said wheel, and provided with one or more collars or shoulders of greater diameter than the periphery of the screw, to receive the thrust and prevent the running down of the load, substantially as described.

4. The worm or tangent screw F, provided with the shoulders $b$ and $h$, one smaller and the other larger in diameter than the periphery of the thread, in combination with a fixed and a movable bearing, arranged and operating substantially as described.

Executed at Boston this 5th day of February, 1874.

FELIX P. CANFIELD.

Witnesses:
WM. P. EDWARDS,
L. A. WOOD.